(12) United States Patent
Dietz

(10) Patent No.: US 7,681,533 B2
(45) Date of Patent: *Mar. 23, 2010

(54) MULTIPLE FUNCTION ANIMAL FURNITURE SYSTEM

(76) Inventor: Dan Dietz, 10234 Emerald Dr., Houston, TX (US) 77074

( * ) Notice: Subject to any disclaimer, the term of this patent is extended or adjusted under 35 U.S.C. 154(b) by 747 days.

This patent is subject to a terminal disclaimer.

(21) Appl. No.: 11/438,040

(22) Filed: May 19, 2006

(65) Prior Publication Data

US 2006/0260551 A1      Nov. 23, 2006

Related U.S. Application Data

(63) Continuation-in-part of application No. 11/287,716, filed on Nov. 28, 2005, now Pat. No. 7,234,415, which is a continuation-in-part of application No. 11/121,797, filed on May 4, 2005, now Pat. No. 7,237,506.

(51) Int. Cl.
*A01K 1/03* (2006.01)
*A01K 1/035* (2006.01)
(52) U.S. Cl. ..................... 119/482; 119/28.5
(58) Field of Classification Search ............... 119/28.5, 119/482, 500, 501
See application file for complete search history.

(56) References Cited

U.S. PATENT DOCUMENTS

| 2,532,863 | A | * | 12/1950 | Taylor | 217/14 |
| 2,579,797 | A |  | 12/1951 | Churchfield et al. | |
| 3,234,908 | A |  | 2/1966 | Doskocil | |
| 3,618,568 | A | * | 11/1971 | Breeden | 119/482 |
| 3,995,592 | A | * | 12/1976 | Goldstaub et al. | 119/500 |
| 4,224,899 | A |  | 9/1980 | Cruchelow et al. | |
| 4,253,204 | A | * | 3/1981 | Tasaka | 5/2.1 |
| 4,334,501 | A |  | 6/1982 | McDaniel et al. | |
| 4,347,807 | A | * | 9/1982 | Reich | 119/499 |
| D288,970 | S |  | 3/1987 | Runion | |
| 4,719,656 | A |  | 1/1988 | Godinet | |
| 4,838,204 | A |  | 6/1989 | Young | |
| 5,148,768 | A |  | 9/1992 | Hinton | |

(Continued)

OTHER PUBLICATIONS

Notice of Allowance for U.S. Appl. No. 11/121,797 dated Mar. 16, 2007.

(Continued)

*Primary Examiner*—Rob Swiatek
(74) *Attorney, Agent, or Firm*—Daniel N. Lundeen; Lundeen & Lundeen, PLLC

(57) ABSTRACT

A multi-purpose furniture structure and system may be used for caring for an animal throughout the life of the animal. For small animals such as puppies, this furniture system may be used as a dwelling in which the owner may train the animal to behave in a desired manner. Animal toys may be stored in the animal living space as well. A removable barrier such as a grate or plastic ventilated sheet may cover a front opening to prevent undesirable movement of the animal in and out of the furniture structure. Animals may use a detachable ramp member to climb to the top of the furniture structure. For larger or older animals, the furniture structure may serve as a bed or as a means to help the animal get into the bed of the owner. The furniture structure may form a bed for animals of all ages. The bed may be positioned adjacent an owner's bed.

16 Claims, 5 Drawing Sheets

U.S. PATENT DOCUMENTS

| | | | | |
|---|---|---|---|---|
| 5,211,130 | A * | 5/1993 | Elias et al. | 119/28.5 |
| D369,885 | S | 5/1996 | Zeiler | |
| 5,662,065 | A | 9/1997 | Bandimere et al. | |
| 5,765,505 | A | 6/1998 | Yun | |
| 5,778,822 | A | 7/1998 | Giffin et al. | |
| 5,964,189 | A * | 10/1999 | Northrop et al. | 119/482 |
| 5,964,190 | A * | 10/1999 | Willinger et al. | 119/500 |
| 6,189,487 | B1 | 2/2001 | Owen et al. | |
| 6,267,082 | B1 * | 7/2001 | Naragon et al. | 119/849 |
| 6,295,950 | B1 | 10/2001 | Deitrich et al. | |
| 6,490,995 | B2 | 12/2002 | Greene, Jr. | |
| 6,581,545 | B1 * | 6/2003 | Foster | 119/482 |
| 6,588,366 | B1 * | 7/2003 | Ranson et al. | 119/28.5 |
| 6,748,895 | B2 | 6/2004 | Besenzoni | |
| 7,234,415 | B2 * | 6/2007 | Dietz | 119/28.5 |
| 7,237,506 | B2 * | 7/2007 | Dietz | 119/28.5 |
| 2002/0152969 | A1 | 10/2002 | Grigsby et al. | |
| 2003/0066489 | A1 | 4/2003 | Whitehill | |
| 2004/0134433 | A1 | 7/2004 | Holder | |
| 2004/0177814 | A1 | 9/2004 | Godshaw | |
| 2005/0279286 | A1 | 12/2005 | Youngmark | |
| 2006/0011289 | A1 | 1/2006 | Suriano | |
| 2006/0042548 | A1 * | 3/2006 | Tharalson et al. | 119/28.5 |
| 2006/0112897 | A1 | 6/2006 | Moore | |
| 2006/0118051 | A1 | 6/2006 | Lima | |

OTHER PUBLICATIONS

Office Action for U.S. Appl. No. 11/121,797 dated Dec. 12, 2006.
Office Action for U.S. Appl. No. 11/121,797 dated Aug. 21, 2006.
Notice of Allowance for U.S. Appl. No. 11/287,716 dated Mar. 16, 2007.
Office Action for U.S. Appl. No. 11/287,716 dated Dec. 29, 2006.
Office Action for U.S. Appl. No. 11/287,716 dated Sep. 8, 2006.
PCT International Search Report for International Application No. PCT/US2006/017361 dated Sep. 12, 2006 (2 p.).
PCT International Search Report for International Application No. PCT/US2006/017029 dated Sep. 15, 2006 (2 p.).
PCT International Search Report for International Application No. PCT/US2006/017011 dated Sep. 11, 2006 (2 p.).

* cited by examiner

MULTIPLE FUNCTION ANIMAL FURNITURE SYSTEM

CROSS-REFERENCE TO RELATED APPLICATIONS

This application is a continuation-in-part application of U.S. application Ser. No. 11/287,716 filed on Nov. 28, 2005, now U.S. Pat. No. 7,234,415, which is a continuation-in-part of U.S application Ser. No. 11/121,797 filed on May 4, 2005, now U.S. Pat. No. 7,237,506, which are each herein incorporated by reference in their entirety.

STATEMENT REGARDING FEDERALLY SPONSORED REASEACH OR DEVELOPMENT

Not applicable.

BACKGROUND OF THE INVENTION

1. Field of the Invention

This invention relates to furniture for an animal and in particular to a piece of furniture that has multiple configurations and can function in multiple ways to accommodate various desires of the animal at any stage of growth. More particularly, this furniture structure and system may function as a living quarters for smaller animals such as puppies during house training periods, a storage location for objects related to the animal, as an animal bed, a sitting bench for humans or animals, and/or as an animal step for getting into a human bed.

2. Background of the Invention

For many people, pet animals are members of the family. Some of these pets live inside the home with the owner and have many accessories designed especially for the animal. As with the "dog houses" kept in the yard, some of the furnishings provide a place for the animal to dwell as well as providing a storage place for the toys of the animal. One conventional piece of animal furniture is a bed. There have been many types of animal beds. These beds are available in various designs. Some of the designs include beds shaped as different types of animals. Many beds in the form of animal designs are made of a cushion material to facilitate animal comfort.

One animal bed is disclosed in U.S. Pat. No. 5,662,065 and describes an animal bed that includes an annular bed frame defining an interior chamber. A perforated top wall is supported at its periphery by the bed frame to receive and support the animal above the chamber. The perforated top wall is composed of a non-woven fabric material to provide a hammock-like suspension for the animal and to permit small insects to fall through the top wall. The chamber is dimensioned to provide a space below the top wall sufficient to inhibit the insects from traveling upwardly through the top wall. An insect exterminating composition contained within the chamber receives the falling insects and destroys them.

U.S. Pat. 288,970 describes a combined animal bed and housing unit. This design has a bed mat resting on a storage unit. The bed also has a canopy covering the mat. The animal would rest on the mat and would be covered by the canopy.

Although the animal bed is a common piece of furniture for the inside pet, animals do more than just sleep. For indoor animals, there is a need for the animal to know when, where and how to "use the bathroom." Cats usually have a litter box for waste. Many pets and owners have a system by which the pet is let out of the house on a periodic basis to relieve themselves. Pets also have toys with which they play. One particular thing some pets like to do is to climb up on the owner's bed. The climbing is necessary because many pets cannot jump high enough to reach the surface of the bed in one jump. The climbing process results in the pet pulling and sometimes tearing the bed linen. Pets also do not stay the same size. As the pet grows, it is often necessary to replace a piece of animal furniture with a different type of furniture or a larger size of the same furniture.

With all of the different types of animal furniture that is available to accommodate the many needs of the pet and pet owner, there remains a need for a multiple function piece of animal furniture.

BRIEF SUMMARY OF SOME OF THE PREFERRED EMBODIMENTS

It is an objective of the present invention to provide a multiple purpose animal furniture system that can accommodate uses of animals at all ages.

It is a second objective of the present invention to provide a multiple purpose piece of animal furniture with modular components to provide the capability to reconfigure the furniture as needed.

It is a third objective of the present invention to provide a training cage to assist in training of small animals for indoor living.

It is a fourth objective of the present invention to provide a removable floor cover for the furniture piece to facilitate ease of cleaning animal waste.

It is a fifth objective of the present invention to provide a furniture piece with a living and storage area.

It is a sixth objective of the present invention to provide a removable grill-type cover that serves as a guard to keep a smaller animal inside the furniture piece.

It is a seventh objective of the present invention to provide a multiple purpose animal furniture piece that can be used as a bed for an animal or a rest bench for humans.

It is an eighth objective of the present invention to provide a portable piece of animal furniture that can be made of various materials such as wood, plastic, rubber or metal.

It is a ninth objective of the present invention to provide a portable piece of animal furniture that can be positioned adjacent to an owner's bed.

It is a tenth objective of the present invention to provide a container in which to bury a deceased animal.

The present invention provides a multi-purpose furniture piece and system that can be used for an animal throughout the life of the animal. For small animals such as puppies, this furniture system can be used as a dwelling in which the owner can train the animal to behave in a desired manner. The animal training may include animal potty training. Animal toys may also be stored in the animal living space as well. A removable barrier such as a grate or plastic ventilated sheet may cover a front opening to prevent undesirable movement of the animal in and out of the furniture piece. Animals may use a detachable ramp member to climb to the top of the furniture piece. For larger or older animals, the furniture piece may serve as a bed or as a means to help the animal get into the bed of the owner. The furniture piece may form a bed for animals of all ages. The bed may be positioned adjacent an owner's bed.

This invention comprises a multiple function piece of furniture used primarily for the activities of a pet. The furniture piece may have various shapes, for example a square or rectangular shape design with four sides, a top surface and an optional bottom surface. The top is connected to the walls with hinges that allow the top to be able to be raised and thereby opening the furniture piece. The front side of the furniture piece is open to allow for storing objects inside the furniture piece. An optional metal or plastic grate or screen may cover the front opening. This cover may be a detachable member of the furniture piece. Additional openings may also be included in the design of the furniture. These openings may be smaller in size and may be in the sides (walls) away from the front opening. These side openings may also be covered with a cover similar to the front opening. The furniture piece may have a floor inside the storage or living area. A mat material lines the floor. This material is removable from the furniture piece. A primary purpose of the material is to serve as a potty training mat. The bottom of that open side has a lip element that extends the complete length of that side to prevent objects from rolling out of the furniture bed. Lips may also extend upward from each side of the furniture piece to create an area on the top for a sleeping pad for an animal. The pad serves as the animal bed. The material for the animal bed element may be of any conventional material that is used in animal beds. The remaining walls of the furniture bed comprise a plurality of openings (e.g., mesh). The multiple function furniture piece may be positioned adjacent a human bed enabling humans to use the bed as a rest bench or as a step to enable animals to get into the human bed or to the top of the furniture piece.

The animal throughout the animal's life may use this piece of furniture. Basically, the piece of furniture may serve as an indoor dwelling for the animal. This piece of furniture may assist in "potty training" animals as well as other behavior training. The multiple function furniture piece may also have components that enable the animal to climb up the furniture and get into an owner's bed. Further, this furniture piece may serve as an elevated bed for larger animals.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The multiple function animal furniture piece provides an animal owner with a system they may use for an animal throughout the life of the animal. The multiple function animal furniture piece may serve as a training cage to help train small animals such as puppies for living indoors. A detachable mat on the floor of the multiple function animal furniture piece provides for ease in cleaning animal waste. A removable front cover such as a grill or grate may serve to restrict undesired movement of the animal in and out of the furniture piece. As an animal gets older and/or bigger, the animal may no longer dwell inside the multiple function animal furniture piece. At this point, the multiple function animal furniture piece may have another function as a store structure. The multiple function animal furniture piece may have an attachable ramp member for use by an animal to climb to the top of the multiple function animal furniture piece structure. This ramp is especially useful for smaller animals and older animals. The ramp may be stored inside the multiple function animal furniture piece when the ramp is not in use. The multiple function animal furniture piece is portable and may be positioned adjacent the owner's bed. In this arrangement, the animal may easily move to the owner's bed. Further, the owner may easily sit on the top of the multiple function animal furniture piece. When an animal dies, the structure may be converted into a container (e.g., coffin) for burying the deceased animal.

Figure 1:
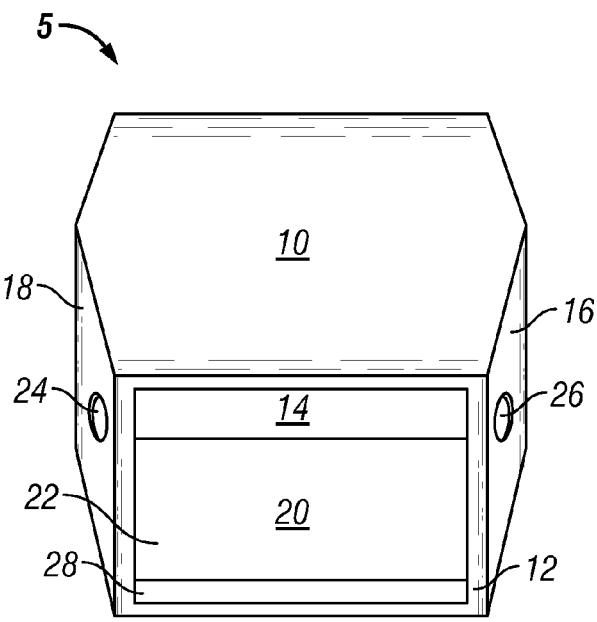
FIG. 1 illustrates a front, top and side view of the multiple function animal furniture piece.

FIG. 1 shows a general design of the multiple function animal furniture piece 5. Other configurations such as those described in U.S. patent application Ser. No. 11/121,797 to the same inventor may be implemented to achieve the same results as the design described in FIG. 1. As shown, multiple function animal furniture piece 5 has a top 10, open front side 12, a back side 14, and multiple side walls 16 and 18. The number of sides may vary with the particular design shape. Multiple function animal furniture piece 5 may also contain a floor 20. The front side 12 has an opening 22, which covers a large portion of the front side 12. This large opening 22 allows for animals to enter multiple function animal furniture piece 5. Without limitation, the opening 22 also allows for insertion of toys, food and water trays into the multiple function animal furniture piece 5. In addition, smaller openings 24 and 26 may be disposed in the side walls 16, 18. Without limitation, these openings 24, 26 may improve ventilation in multiple function animal furniture piece 5. The front side 12 also has a lip 28 that extends up from the base. Without limitation, lip 28 serves to prevent toys such as balls from accidentally rolling out of the multiple function animal furniture piece 5. In addition, a lip section (not illustrated) may also be attached to the top 10. Without limitation, this lip section may serve as restraining means to stabilize the cushion and keep the cushion stationary when an animal is resting on it.

Figure 1A:
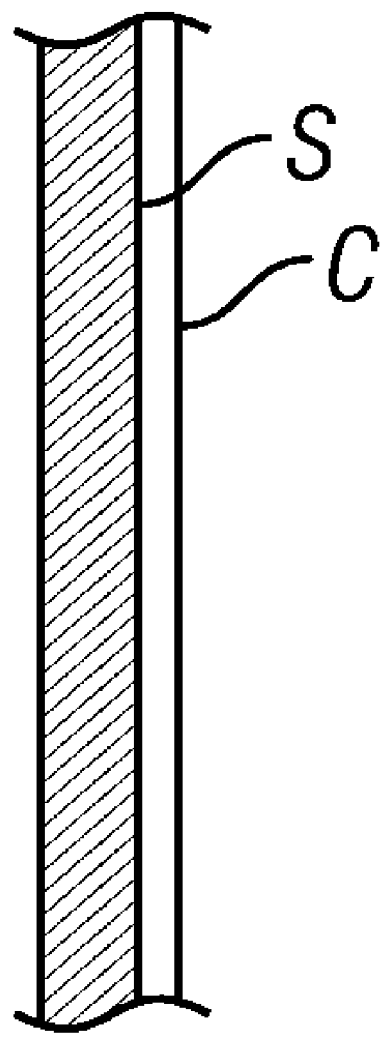
FIG. 1A is a partial sectional view schematically illustrating a cover on a surface according to an embodiment of the multiple function animal furniture piece.

Multiple function animal furniture piece 5 may be composed of any material suitable for the uses of multiple function animal furniture piece 5. For instance, multiple function animal furniture piece 5 may include wood, mesh, wire, plastic, metal, and the like. In an embodiment, back side 14 and/or multiple side walls 16 and 18 may be composed of a plurality of openings in addition to openings 24, 26. The additional penings may be of any desired shape and configuration. In such an embodiment, back side 14 and/or multiple side walls 16 and 18 may comprise wire, mesh, netting, weaving, and the like, preferably wire or mesh, and more preferably wire or wire-like material. Moreover, back side 14 and/or multiple side walls 16 and 18 may be composed of any porous material suitable for use as a side in an animal cage (e.g., porous metal or plastic siding). In an embodiment, back side 14 and/or multiple side walls 16 and 18 are composed of a plastic, wood, metal, or the like wire or wire-like material. One or more of multiple side walls 16 and 18 (preferably all) may be composed of such materials. In an embodiment (see FIG. 1A), an outer covering C may be disposed on the outside and/or inside surface S of one or more of back side 14 and/or multiple side walls 16 and 18, preferably an outer covering is disposed on the outside surface. In some embodiments, an outer covering C is disposed on the outside surface S of multiple side walls 16 and 18 and back side 14. The outer covering may cover any desired portion of a side. The outer covering may comprise any suitable covering for use with animals. For instance, the outer covering may be composed of natural or synthetic woods, veneers, vinyl, wicker, plastic, ceramic, and the like. In an embodiment, top 10 and/or front side 12 may also be composed of such plurality of openings and alternatively may also include such an outer covering. In alternative embodiments, at least one side and/or wall of multiple function animal furniture piece 5 comprises a substantially solid material.

Figure 2:
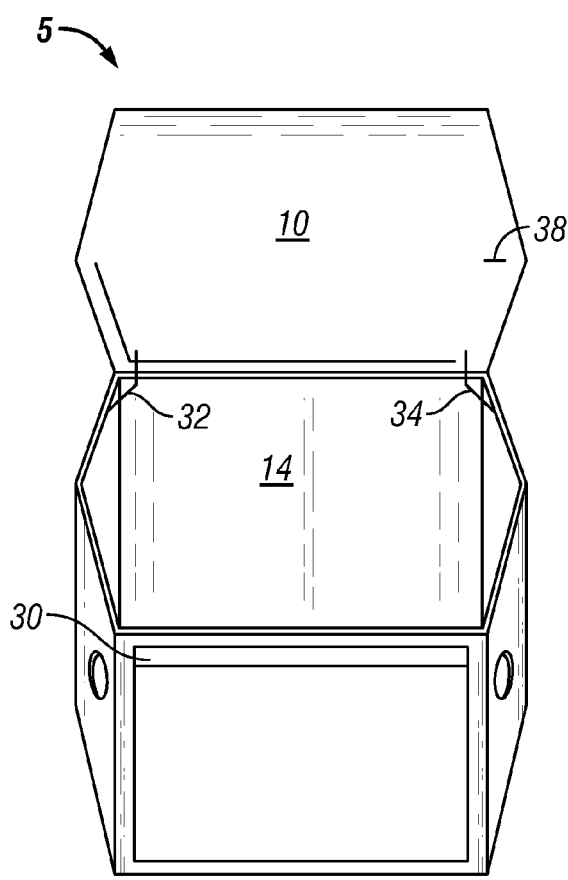
FIG. 2 illustrates a view of the multiple function animal furniture piece with the top extended up to open the furniture piece.

FIG. 2 shows the multiple function animal furniture piece 5 with the top 10 extended in an upward position, which thereby opens up multiple function animal furniture piece 5. As shown, a bar 30 extends across the front side of multiple function animal furniture piece 5 and serves as a rest bar for the top 10. Hinges 32 and 34 attach the top 10 to the back side 14 and allow the top 10 side to open and close as desired. Attached to the inside surface of the top 10 side is a rack member 36 for holding a ramp member when the ramp member is not in use. The rack may have any suitable shape (e.g., an L-shape) that fits with the shape of a rectangular ramp member. In an embodiment, the rack is a groove with a generally u-shape in which the ramp member is placed. When the ramp member is placed in the rack means, a latch 38 secures the ramp in the rack member.

Figure 3:
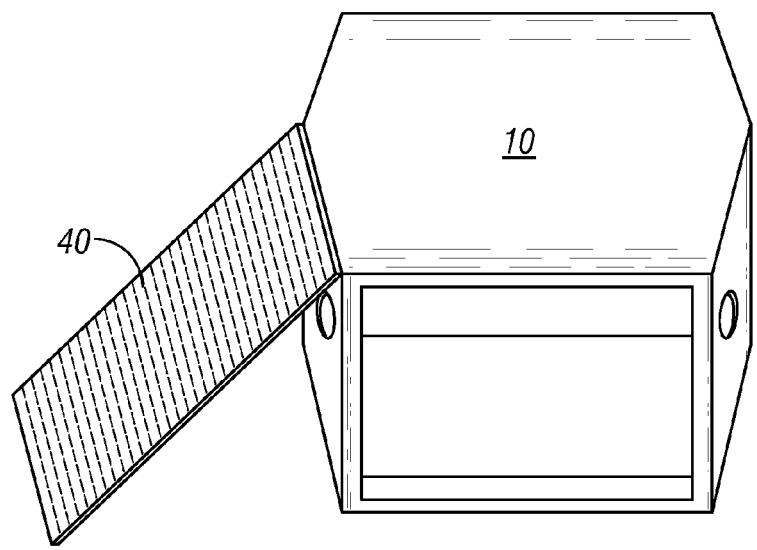
FIG. 3 illustrates a view of the multiple function animal furniture piece with a ramp member extended from the furniture piece.

FIG. 3 shows a configuration of the multiple function animal furniture piece 5 with a detachable ramp 40 engaged at one side. In this configuration, an animal may climb to the top 10 of multiple function animal furniture piece 5 without the need to climb up on a bed or other piece of furniture. Depending on the height of multiple function animal furniture piece 5, the length of the ramp 40 may vary such that the inclination angle formed by the engagement of the ramp 40 to multiple function animal furniture piece 5 is not too steep for the animal to safely climb.

Figure 4:
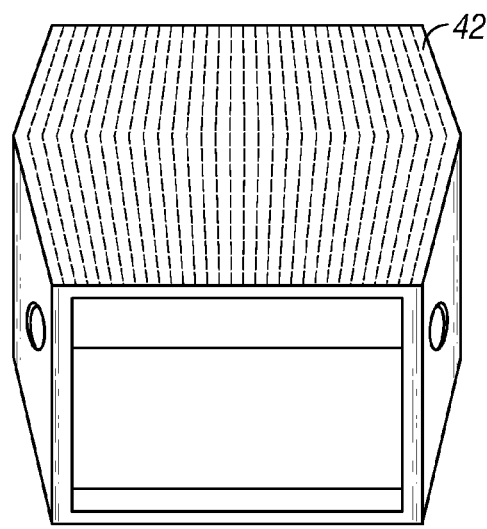
FIG. 4 illustrates an illustration of the multiple function animal furniture piece with a cushion material positioned on the top on which an animal may rest or sleep.
Figure 9:
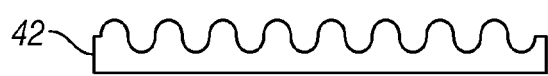
FIG. 9 illustrates a cross-section view of the cushion material positioned on the top of the furniture piece.

FIG. 4 shows the multiple function animal furniture piece 5 with the cushion material 42 positioned on the top 10. As mentioned, the cushion material 42 serves as a cushion on which an animal may rest or sleep. FIG. 9 shows the cross-section of a typical cushion that may be used with multiple function animal furniture piece 5. Other types of cushions with varying shapes may also be implemented in a similar manner.

Figure 5:
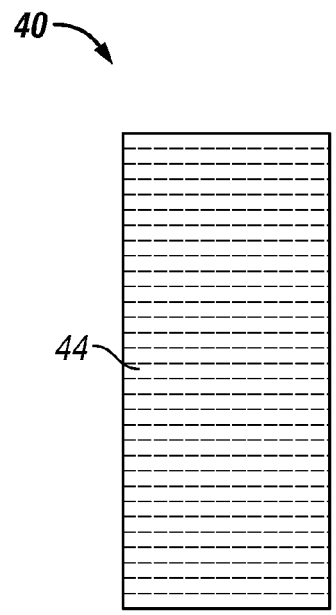
FIG. 5 illustrates a frontal side view of the ramp member.
Figure 6:
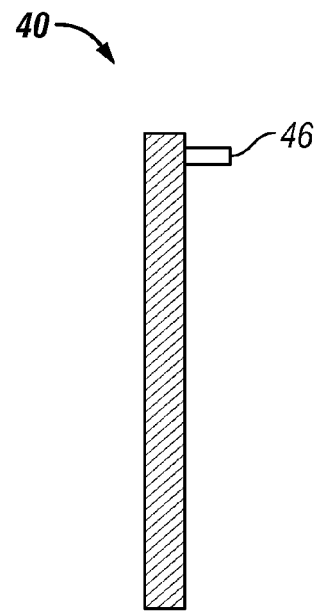
FIG. 6 illustrates a side cross-section view of the ramp member showing a lip used to enable the ramp member to engage the furniture piece.

FIG. 5 shows a front view of the ramp member 40. Attached to this front side is a fiber-type material 44 such as a cloth or carpet material. Fiber-type material 44 increases the friction of the ramp member 40 such that an animal may have good traction as the animal climbs the ramp member 40 to the top 10. FIG. 6 shows a side cross-sectional view of the ramp member 40. The ramp member 40 contains a lip 46 that engages the edge of the top side securing the ramp member 40 to multiple function animal furniture piece 5.

Figure 7:
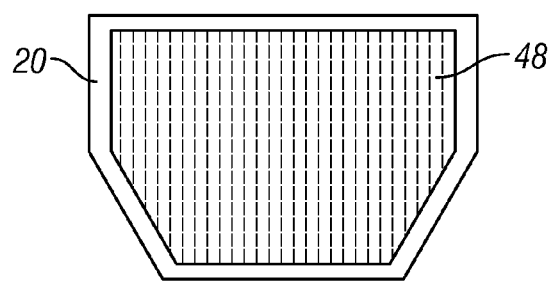
FIG. 7 illustrates a view down on the floor mat positioned on the furniture piece.
Figure 8:
FIG. 8 illustrates a side cross-section view of the floor mat.

FIG. 7 shows a view of the floor 20 of multiple function animal furniture piece 5 covered by a mat material 48. Mat material 48 may be an elastic or rubber type of material or other type of water-proof material. The mat material 48 extends up the side walls of multiple function animal furniture piece 5 thereby covering substantially all of the floor 20. This mat material 48 provides a way to easily clean multiple function animal furniture piece 5. As mentioned, multiple function animal furniture piece 5 may serve as a house for a smaller pet. Typically, these pets are initially not potty trained. Any waste secreted by the animal may not penetrate to the floor. When cleaning, the owner may raise the top 10 of multiple function animal furniture piece 5 and remove the mat material 48. The owner may then clean the mat material 48. FIG. 8 shows the cross-section of the mat material 48. The edge 50 of the mat 48 has a lip shape that prevents substances from escaping the mat material 48 surface. The mat material 48 may also have a ridged surface similar to FIG. 9 for channeling liquid.

Figure 10:
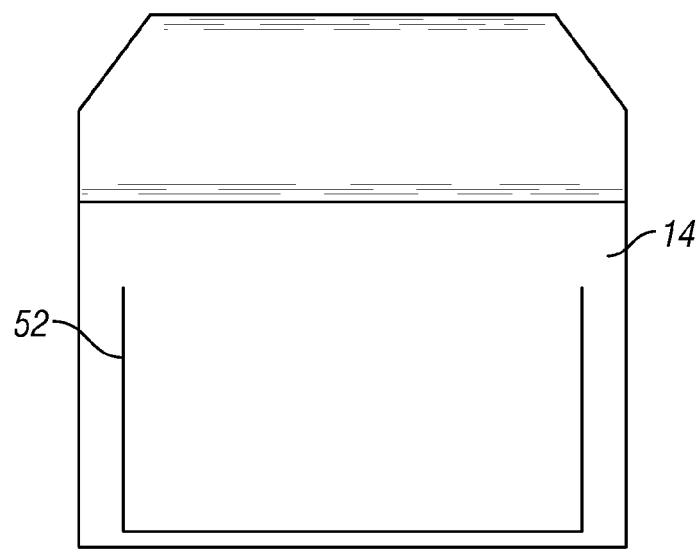
FIG. 10 illustrates a view of the back side of the furniture piece showing a rack means used to store a grate or screen.
Figure 11:
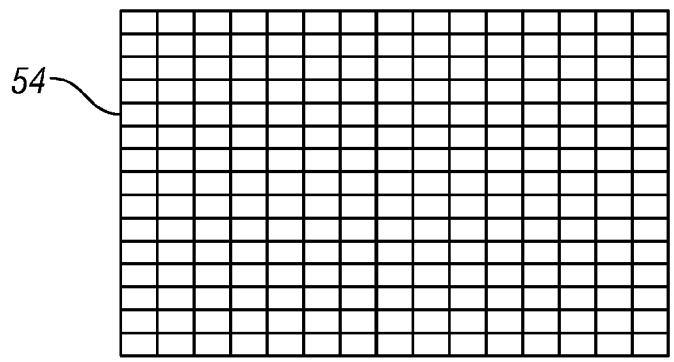
FIG. 11 illustrates a design of a detachable grate used to cover the front opening of the furniture piece.
Figure 12:
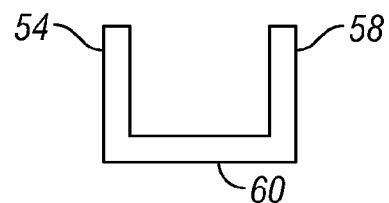
FIG. 12 illustrates a cross-section view of the guide used for storing the grate.

FIG. 10 shows the back side 14 of multiple function animal furniture piece 5. Attached to this back side 14 is a storage rack 52 similar to the rack member 36. Without limitation, storage rack 52 is for the purpose of holding grate 54 shown in FIG. 11. Storage rack 52 has a general shape that matches the shape of the grate 54. FIG. 12 shows a cross-section of the storage rack 52. Storage rack 52 has two sides 56 and 58 and a base 60. The two sides 56, 58 are perpendicularly attached to the base 60. One side is also attached to the back side 14. When the grate 54 is not in use, the owner may slide the grate 54 into the storage rack 52. The grate 54 may be used to cover the front opening 22. The grate 54 may have different designs and may also be composed of screen material. In addition, other conventional materials such as plastic may be used as this front opening 22 cover.

As mentioned, the structure and system of the multiple function animal furniture piece 5 provides the owner of an animal with the versatile means for providing care for the animal. This structure and system may accommodate activities for animals of all ages and sizes. The structure serves as both a dwelling for small animals as well as a training cage to teach certain behaviors. The internal storage capacity makes this structure useful for any animal that has toys. The ability to store the detachable components of the system within the structure itself makes this system easy to manage. The portability of the structure enables the owner to position it at any location. As mentioned, owners can use it as a bed for the animal or as a means for the animal to climb into the owner's bed. The attachable ramp also makes it easy for animals of all ages and sizes to climb the ramp to the top side of the structure. At the animal's death, the structure may serve as a container coffin in which to bury the animal.

Although the present invention and its advantages have been described in detail, it should be understood that various changes, substitutions and alterations may be made herein without departing from the spirit and scope of the invention as defined by the appended claims.

What is claimed is:

1. A multiple function animal furniture structure comprising:
   a structure having a top side, a bottom side, a back side and at least one side wall, said top side capable of supporting a sleeping material for an animal, and said top side capable of being positioned at multiple angles with regard to said bottom side to allow for the opening and closing of the structure;
   a front side connected to said top and bottom sides, said front side having a front side opening substantially forming said front side;
   a lip element extending up from said front side and extending the length of said front side, and wherein the back side, at least one side wall, or combinations thereof comprise a plurality of openings; and
   a support bar extending across the front side at a top edge of the front side, said bar providing support for the top side when in a closed position.

2. The multiple function animal furniture structure of claim 1, further comprising a detachable ramp member, said ramp member providing a surface on which an animal climbs to the top side.

3. The multiple function animal furniture structure of claim 2, further comprising a first rack member attached to said top side, said rack member capable of securing and holding said ramp member when said ramp member is not in use.

4. The multiple function animal furniture structure of claim 2, wherein said ramp member further comprises a fiber material attached to an up side of said ramp to provide friction when an animal is climbing said ramp.

5. The multiple function animal furniture structure of claim 4, wherein said ramp member has a lip member attached on a down side of the said ramp, said lip member engaging the top side of the structure and thereby securing said ramp to said structure.

6. The multiple function animal furniture structure of claim 1, further comprising a mat material disposed in the structure, said mat material substantially covering said bottom side.

7. The multiple function animal furniture structure of claim 1, further comprising a detachable screen member covering the front side opening.

8. The multiple function animal furniture structure of claim 7, wherein said screen member is a grate.

9. The multiple function animal furniture structure of claim 8, further comprising a rack member attached to said back side, said rack member capable of securing and holding said grate when said grate is not in use.

10. The multiple function animal furniture structure of claim 1, wherein the back side, at least one side wall, or combinations thereof comprise wire, mesh, netting, weaving, or combinations thereof.

11. The multiple function animal furniture structure of claim 1, wherein the back side, at least one side wall, or combinations thereof comprise wire or wire-like material.

12. The multiple function animal furniture structure of claim 1, further comprising an outer covering disposed on an outer surface of the back side, at least one side wall, or combinations thereof.

13. A multiple function animal furniture system for caring for an animal throughout a life to the animal comprising:
   a structure for having an inner space, said structure having a top side and a front side;
   an attachable board member for enabling smaller animals to climb to a top of the structure; and
   a cover member for covering a front opening in the front side of the structure, wherein at least a portion of the structure comprises a plurality of openings; and
   a support bar extending across the front side at a top edge of the front side, said bar providing support for the top side when in a closed position.

14. The multiple function animal furniture system of claim 13, wherein the at least a portion of the structure comprises wire or wire-like material.

15. The multiple function animal furniture system of claim 13, wherein an outer covering is attached to the at least a portion of the structure.

16. The multiple function animal furniture system of claim 13, wherein the at least a portion of the structure comprises wire, mesh, netting, weaving, or combinations thereof.

* * * * *